United States Patent
Huang et al.

(10) Patent No.: US 11,805,054 B1
(45) Date of Patent: Oct. 31, 2023

(54) METHOD AND ELECTRONIC DEVICE FOR SAVING POWER APPLIED TO A ROUTER

(71) Applicant: MEDIATEK INC., Hsinchu (TW)

(72) Inventors: Yu-Hua Huang, Hsinchu (TW);
Ming-Jun Lin, Hsinchu (TW);
Huei-Jing Yang, Hsinchu (TW);
Kai-Wen Liu, Hsinchu (TW);
Yuan-Ting Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/724,043

(22) Filed: Apr. 19, 2022

(51) Int. Cl.
*H04L 61/256* (2022.01)
*H04L 45/00* (2022.01)

(52) U.S. Cl.
CPC ............ *H04L 45/56* (2013.01); *H04L 61/256* (2013.01)

(58) Field of Classification Search
CPC ............... H04L 61/256; H04L 61/2564; H04L 61/2567; H04L 61/2578; H04L 61/2592; H04L 61/2596
See application file for complete search history.

(56) References Cited

U.S. PATENT DOCUMENTS

2014/0068044 A1* 3/2014 McKinney .......... H04L 61/2553 709/223
2019/0379600 A1* 12/2019 Bisht ................... H04L 61/2521

FOREIGN PATENT DOCUMENTS

WO WO-2013063791 A1 * 5/2013 ......... H04L 63/0209

* cited by examiner

*Primary Examiner* — Ryan J Jakovac
(74) *Attorney, Agent, or Firm* — McClure, Qualey & Rodack, LLP

(57) ABSTRACT

A method of routing data packets for a router is provided. The router includes a software network address translator (NAT) and a hardware NAT. The method includes routing, by the software NAT, a first data packet based on a routing rule stored in the software NAT, wherein the software NAT has a routing rule removing function to remove the routing rule stored in the software NAT; sending, by the software NAT, the routing rule to the hardware NAT; storing the routing rule, by the hardware NAT, in the hardware NAT; and routing, by the hardware NAT instead of the software NAT, a second data packet based on the routing rule stored in the hardware NAT. The routing rule removing function of the software NAT for the routing rule stored in the software NAT is disabled.

10 Claims, 3 Drawing Sheets

METHOD AND ELECTRONIC DEVICE FOR SAVING POWER APPLIED TO A ROUTER

CROSS REFERENCE TO RELATED APPLICATIONS

Field of the Disclosure

The present invention is related to a method for saving power, and in particular it is related to a method and an electronic device for saving power applied to a router.

Description of the Related Art

Routers are currently used to translate the IP address of data packets in an Intranet to that of the data packets in an Extranet. The router may include an application microcontroller and a hardware network address translator. The hardware network address translator offloads Linux Network Stack network address translation (NAT) from the application microcontroller, but needs to send a keep-alive packet every 32 seconds to the application microcontroller, so that the application microcontroller can keep connection tracking with the data packets to remember the link.

However, due to the keep-alive packet being sent every 32 seconds, the application microcontroller may leave a suspend mode every 32 seconds, causing a rise in power consumption by the router.

BRIEF SUMMARY OF THE DISCLOSURE

In order to resolve the issue described above, the present invention provides a method of routing data packets for a router. The router includes a software network address translator (NAT) and a hardware NAT. The method includes routing, by the software NAT, a first data packet based on a routing rule stored in the software NAT, wherein the software NAT has a routing rule removing function to remove the routing rule stored in the software NAT; sending, by the software NAT, the routing rule to the hardware NAT; storing the routing rule, by the hardware NAT, in the hardware NAT; and routing, by the hardware NAT instead of the software NAT, a second data packet based on the routing rule stored in the hardware NAT. The routing rule removing function of the software NAT for the routing rule stored in the software NAT is disabled.

According to the method described above, the hardware NAT has the routing rule removing function to remove the routing rule stored in the hardware NAT. The routing rule removing function of the hardware NAT for the routing rule stored in the hardware NAT is disabled.

According to the method described above, the hardware NAT has a keep-alive function to send a keep-alive packet periodically to the software NAT. The keep-alive function of the hardware NAT for the routing rule stored in the hardware NAT is disabled.

According to the method described above, the step of sending, by the software NAT, the routing rule to the hardware NAT includes: sending, by the software NAT, the routing rule to the hardware NAT based on a threshold number of the data packets relative to the routing rule received by the software NAT from the hardware NAT within a predetermined time. The threshold number is an integer between one and five.

According to the method described above, a timeout used for determining whether to remove the routing rule stored in the software NAT is disabled.

According to the method described above, a timeout used for determining whether to remove the routing rule stored in the software NAT is set to be its maximum value.

The present invention also provides an electronic device. The electronic device includes a software network address translator (NAT) and a hardware NAT. The software NAT is configured to route a first data packet based on a routing rule stored in the software NAT, and send out the routing rule. The software NAT has a routing rule removing function to remove the routing rule stored in the software NAT. The hardware NAT is configured to receive the routing rule from the software NAT, store the routing rule in the hardware NAT, and route a second data packet based on the routing rule stored in the hardware NAT. The routing rule removing function of the software NAT for the routing rule stored in the software NAT is disabled.

According to the electronic device described above, the hardware NAT has the routing rule removing function to remove the routing rule stored in the hardware NAT. The routing rule removing function of the hardware NAT for the routing rule stored in the hardware NAT is disabled.

According to the electronic device described above, the hardware NAT has a keep-alive function to send a keep-alive packet periodically to the software NAT. The keep-alive function of the hardware NAT for the routing rule stored in the hardware NAT is disabled.

According to the electronic device described above, the software NAT sends the routing rule to the hardware NAT based on a threshold number of the data packets relative to the routing rule received by the software NAT from the hardware NAT within a predetermined time. The threshold number is an integer between one and five.

According to the electronic device described above, a timeout used for the software NAT to determine whether to remove the routing rule stored in the software NAT is disabled.

According to the electronic device described above, a timeout used for the software NAT to determine whether to remove the routing rule stored in the software NAT is set to be its maximum value.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means.

The following description is the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
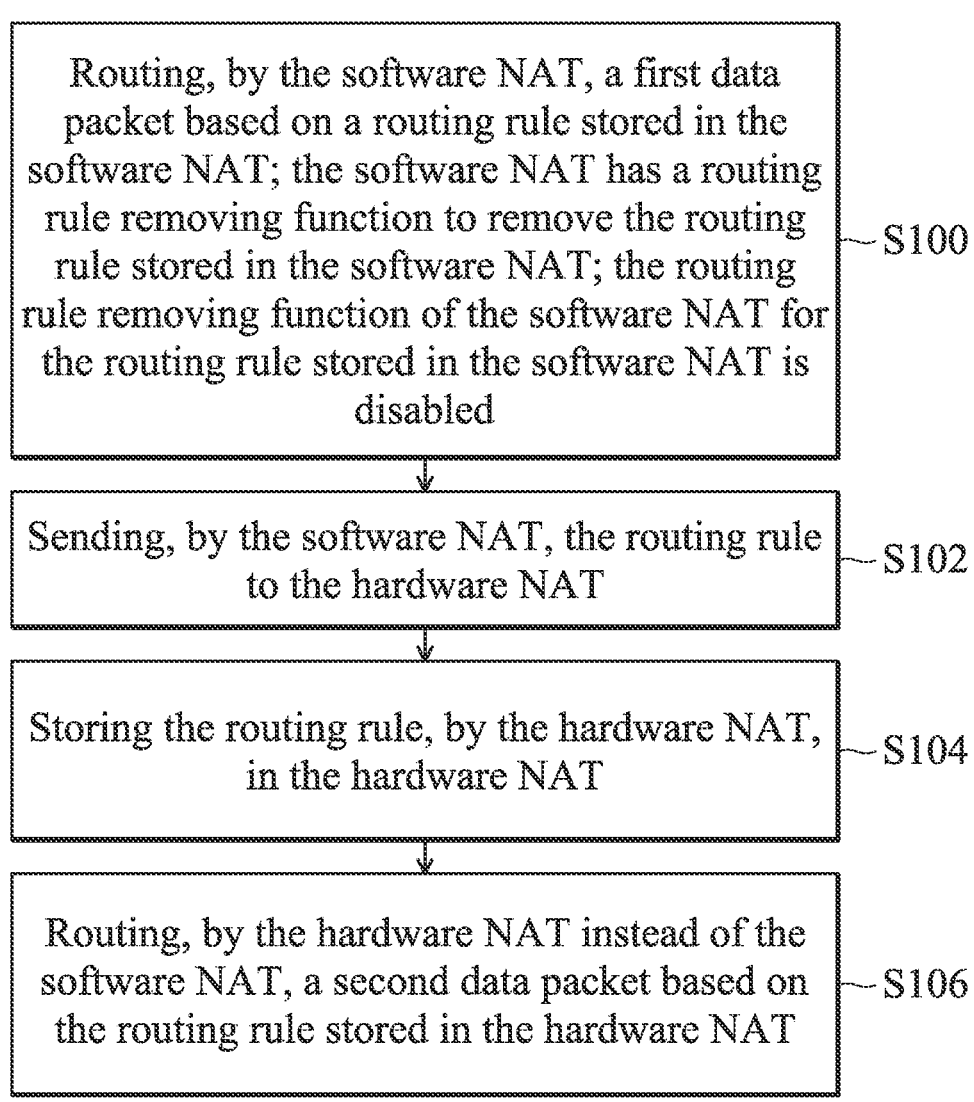
FIG. 1 is a flow chart of a method of routing data packets for a router including a software network address translator (NAT) and a hardware NAT in accordance with some embodiments of the present invention.

FIG. 1 is a flow chart of a method of routing data packets for a router including a software network address translator (NAT) and a hardware NAT in accordance with some embodiments of the present invention. In some embodiments, the hardware NAT receives data packets relative to a routing rule, and passes the data packets to the software NAT based on the routing rule. In some embodiments, the routing rule may include the source that the data packets come from, the destination that the data packets send to, and the types of the data packets. In some embodiments, if two groups of data packets have different sources, different destination or different types, the two groups are relative to different routing rules. In some embodiments, after the hardware NAT receives the data packets relative to the routing rule, the hardware NAT may check whether the routing rule has been recorded in a connection table in the hardware NAT. If yes, the hardware NAT directly sends the data packets to the corresponding destination. If no, the hardware NAT passes the data packets to the software NAT. In some embodiments, the hardware NAT has a routing rule removing function to remove the routing rule stored in the hardware NAT. In some embodiments, the hardware NAT determines whether to remove the routing rule stored in it-self based on a timeout in the hardware NAT.

The software NAT determines whether to send the routing rule to the hardware network address translator based on a threshold number of the data packets relative to the routing rule received by the software NAT from the hardware NAT within a predetermined time. In some embodiments, the threshold number is an integer between one and five. In some embodiments, the software NAT stores the routing rule in a connection table itself and has a routing rule removing function to remove the routing rule stored in the software NAT originally. In some embodiments, the software NAT determines whether to remove the routing rule stored in it-self based on a timeout in the software NAT.

As shown in FIG. 1, the method of the present invention includes routing, by the software NAT, a first data packet based on a routing rule stored in the software NAT, the software NAT has a routing rule removing function to remove the routing rule stored in the software NAT, the routing rule removing function of the software NAT for the routing rule stored in the software NAT is disabled (step S100); sending, by the software NAT, the routing rule to the hardware NAT (step S102); storing the routing rule, by the hardware NAT, in the hardware NAT (step S104); and routing, by the hardware NAT instead of the software NAT, a second data packet based on the routing rule stored in the hardware NAT (step S106).

In step S100, the software NAT routes a data packet based on a routing rule stored in the software NAT. In some embodiments, the routing rule is stored in a connection table in the software NAT. The connection table is present in a memory of the software NAT. In some embodiments, the software NAT may be an application microcontroller, but the present invention is not limited thereto. In some embodiments, the software NAT has a routing rule removing function to remove the routing rule stored in the software NAT. In the routing rule removing function, a timeout (set in the software NAT) is used for software NAT to determine whether to remove the routing rule stored in the software NAT. For example, originally, if the time period that the software NAT does not receive any data packet relative to the routing rule is longer than the timeout, the software NAT may remove the routing rule. However, in some embodiments of the present invention, the routing rule removing function of the software NAT for the routing rule stored in the software NAT is disabled. Therefore, even if the time period that the software NAT does not receive any data packet relative to the routing rule is longer than the timeout, the software NAT may not remove the routing rule, thereby saving the computing resource of the software NAT. That is, the software NAT is unnecessary to prepare (for example, search from communication commands between user ends) the routing rule for the received data packet relative to the same routing rule again, because the routing rule is still stored in the software NAT.

In some embodiments, the timeout used for the software NAT to determine whether to remove the routing rule stored in the software NAT is set to be its maximum value (for example, 65535). In some embodiments, the timeout used for the software NAT to determine whether to remove the routing rule stored in the software NAT is disabled.

In step S102, the software NAT sends the routing rule to the hardware routing rule. In some embodiments, the software NAT sends the routing rule to the hardware NAT based on a threshold number of the data packets relative to the routing rule received by the software NAT from the hardware NAT within a predetermined time. For example, the threshold number may be an integer between 1 and 5. The less the threshold number (or called threshold number) of the data packets is set, the software NAT is easier to send the routing rule to the hardware NAT. For example, if the threshold number of the data packets is set as 1, once the software NAT receives one data packet (for example, per second) relative to the routing rule passed from the hardware NAT, the software NAT may send the routing rule to the hardware NAT. If the threshold number of the data packets is set as 5, once the software NAT receives 10 data packets (for example, per second) relative to the routing rule passed from the hardware NAT, the software NAT may send the routing rule to the hardware NAT. However, once the software NAT receives 4 data packets (for example, per second) relative to the routing rule passed from the hardware NAT, the software NAT may not send the updated routing rule to the hardware NAT. In some embodiments, the NAT capability of the hardware NAT is much better than that of the software NAT.

In some embodiments, after the hardware NAT receives the routing rule from the software NAT, in step S104, the hardware NAT stores the routing rule in the hardware NAT. For example, the routing rule is stored in a connection table in the hardware NAT. Once the hardware network address translator receives the data packets relative to the same routing rule received from the software NAT, for example in step S106, the hardware NAT sends (or routes) the data packets directly to the destination based on the routing rule stored in the hardware NAT. In other words, the hardware NAT is used to accelerate the efficiency of network address translation.

In some embodiments, the hardware NAT has a routing rule removing function. In the routing rule removing function, a timeout (set in the hardware NAT) is used for hardware NAT to determine whether to remove the routing rule stored in the hardware NAT. For example, originally, if the time period that the hardware NAT does not receive any data packet relative to the routing rule is longer than the timeout, the hardware NAT may remove the routing rule. However, in some embodiments of the present invention, the routing rule removing function of the hardware NAT for the routing rule stored in the hardware NAT is disabled. Therefore, even if the time period that the hardware NAT does not receive any data packet relative to the routing rule is longer than the timeout, the hardware NAT may not remove the routing rule.

In some embodiments, the timeout used for the hardware NAT to determine whether to remove the routing rule stored in the hardware NAT is set to be its maximum value (for example, 65535). In some embodiments, the timeout used for the hardware NAT to determine whether to remove the routing rule stored in the hardware NAT is disabled.

Originally, the hardware NAT has a keep-alive function to send a keep-alive packet periodically to the software NAT. However, in some embodiments of the present invention, the keep-alive function of the hardware NAT for the routing rule stored in the hardware NAT is disabled, so that the software NAT may not be wakeup in a suspend mode by receiving the keep-alive packet from the hardware NAT.

In some embodiments, the software NAT enters the suspend mode if there are no wakeup events. In some embodiments, the wakeup events may include receiving other data packets relative to other routing rules; receiving the event that a USB device is installed in the router; or receiving the event that the power key of the router has been pressed. Although the software NAT enters the suspend mode for saving power consumption of the router, the hardware network address translator is still working for NAT, so that the router can remain normal operation.

Figure 2:
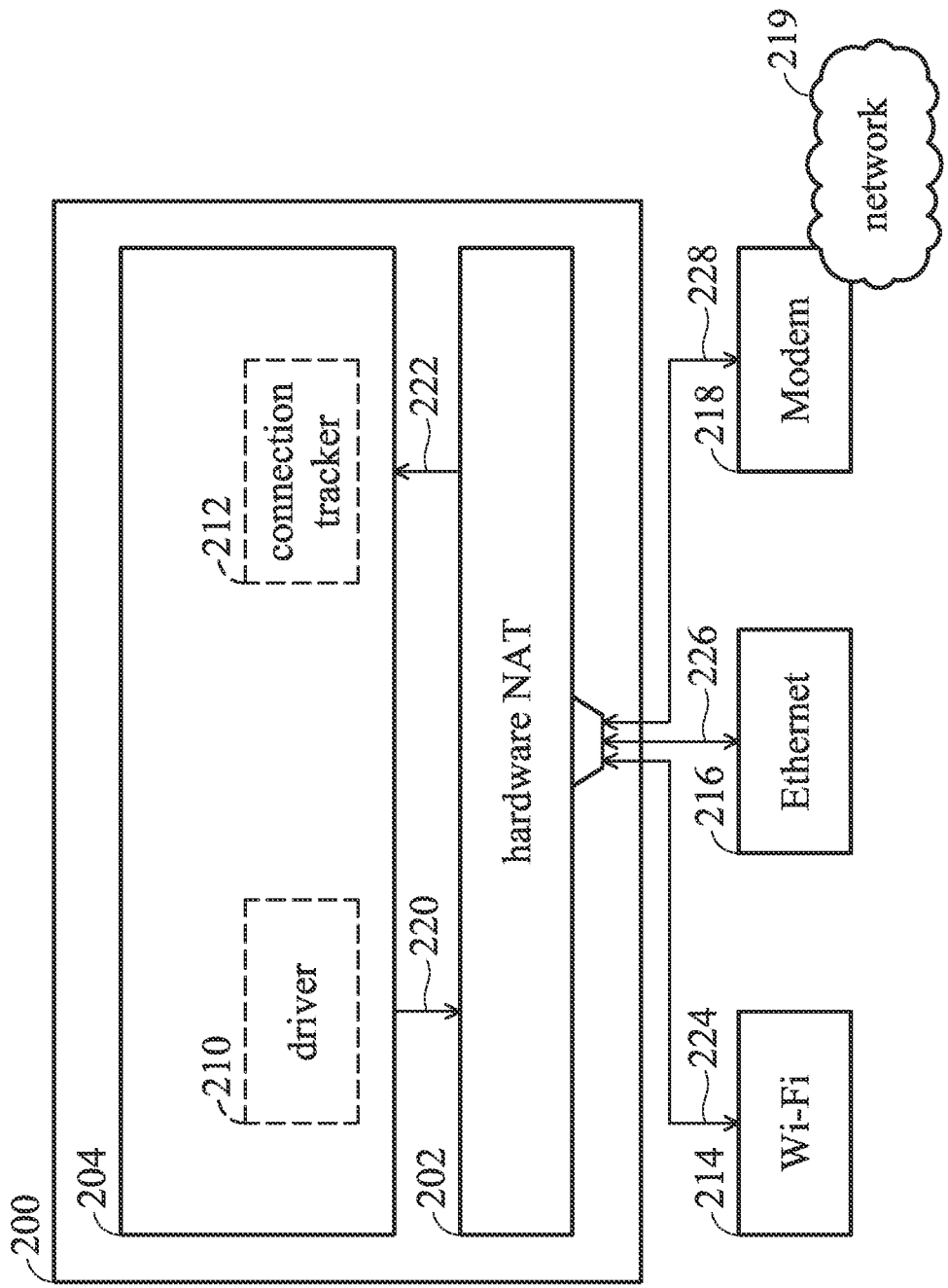
FIG. 2 is a schematic diagram of an electronic device 200 in accordance with some embodiments of the present invention.

FIG. 2 is a schematic diagram of an electronic device 200 in accordance with some embodiments of the present invention. In some embodiments, the electronic device 200 is a router, but the present invention is not limited thereto. As shown in FIG. 2, the electronic device 200 includes a hardware NAT 202 and a software NAT 204. The hardware NAT 202 is configured to receive data packets relative to a routing rule from Wi-Fi 214, Ethernet 216 or a modem 218, and translate an IP address of the data packets in Intranet (such as Wi-Fi 214 and Ethernet 216) to that of the data packets in Extranet (such as the modem 218 and a network 219). For example, the hardware NAT 202 is configured to translate an IP address of data packets in Wi-Fi 214 to that of the data packets in the network 219 through links 224 and 228 and a modem 218. Similarly, the hardware NAT 202 is configured to translate an IP address of data packets in Ethernet 216 to that of the data packets in the network 219 through the links 226 and 228 and the modem 218. After receiving the data packets relative to the routing rule, if the routing rule has been recorded in the connection table in the hardware NAT 202, the hardware NAT 202 directly sends the data packets to the corresponding destination, for example, Wi-Fi 214, Ethernet 216 or the modem 218. If the routing rule has not been recorded in the second connection table in the hardware NAT 202, the hardware NAT 202 passes the data packets to the software NAT 204 through a link 222.

In some embodiments, a driver 210 and a connection tracker 212 are executed by the software NAT 204. In some embodiments, the driver 210 includes the program code for the operation of the software NAT 204, and the threshold number of the data packets relative to the routing rule for the software NAT 204 to determine whether to send the routing rule to the hardware NAT 202. The connection tracker 212 is able to control the routing rule removing function to remove the routing rule stored in the software NAT 204. In some embodiments, the method of present invention sets the threshold number of data packets as 1 to 5 per second by changing the setting in the driver 210. In some embodiments, the method of present invention enables or disables the timeout for the routing rule removing function in the software NAT 204 and hardware NAT 202 by changing the setting in the driver 210. In some embodiments, the method of present invention enables or disables the routing rule removing function in the software NAT 204 by changing the setting in the connection tracker 212. In some embodiments, the software NAT 204 sends the routing rule to the hardware NAT 202 through a link 220.

Figure 3:
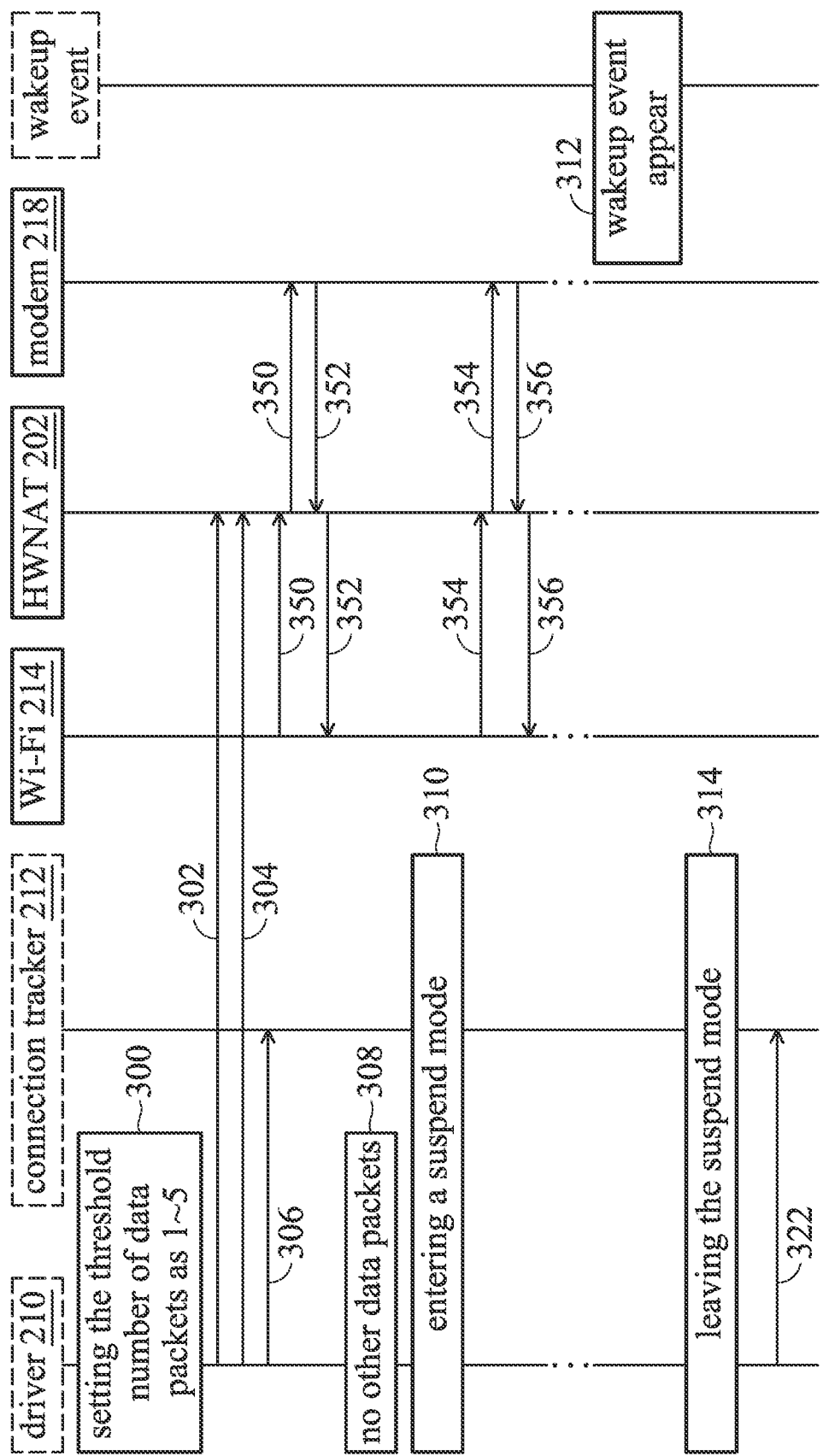
FIG. 3 is a flow chart of the method in FIG. 1 applied to the electronic device 200 in FIG. 2 in accordance with some embodiments of the present invention.

FIG. 3 is a flow chart of the method in FIG. 1 applied to the electronic device 200 in FIG. 2 in accordance with some embodiments of the present invention. The software NAT 204 first receives data packets relative to a routing rule passed from the hardware NAT 202, and routes the data packets based on the routing rule (step S100 in FIG. 1). In some embodiments, the routing rule has been stored in the connection table in the software NAT 204. The software NAT 204 has a routing rule removing function to remove the routing rule. As shown in FIG. 3, the software NAT 204 executes the driver 210 to set the threshold number of data packets that the software NAT 204 determines to send the routing rule to the hardware NAT 202 as 1 to 5 per second (in the block 300)(step S102 in FIG. 1). After that, the software NAT 204 executes the driver 210 to send the routing rule to the hardware NAT 202 through a command 302. In some embodiments, the software NAT 204 further executes the driver 210 to disable the periodical transmission of a keep-alive packet from the hardware NAT 202 (that is, the keep-alive function in hardware NAT 202) to the software NAT 204 through a command 304. In some embodiments, the software NAT 204 executes the driver 210 to send the command 304 to the hardware NAT 202, so that the hardware NAT 202 disables its routing rule removing function based on the command 304. In some embodiments, the software NAT 204 executes the driver 210 to disable the routing rule removing function in the software NAT 204 by sending a command 306 to the connection tracker 212, so that the connection tracker 212 may disable the routing rule removing function in the software NAT 204. That is, the connection tracker 212 is able to disable the timeout for determining whether to remove the routing rule stored in the software NAT 204 according to the command 306.

After the hardware NAT 202 receives the routing rule from the software NAT 204 through the command 302, the hardware NAT 202 stores the routing rule in the connection table in the hardware NAT 202, and is able to translate an IP address of data packets 350 in the Wi-Fi 214 to that of the data packets 350 in the network 219, and sends the data packets 350 to the network 219 through the modem 218. Similarly, the hardware NAT 202 is able to translate an IP address of data packets 352 in the network 219 to that of the data packets 352 in the Wi-Fi 214, and sends the data packets 352 to the Wi-Fi 214 through the modem 218.

In some embodiments, when there are no other data packets received by the software NAT 204 (in the block 308) from the hardware NAT 202, the software NAT 204 is able to enter a suspend mode (in the block 310). In some embodiments, the software NAT 204 enters the suspend mode if there is no wakeup events. For example, the wakeup events may include receiving other data packets relative to other routing rules; receiving the event that a USB device is installed in the router; or receiving the event that the power key of the router has been pressed, but the present invention is not limited thereto.

After the software NAT 204 has entered the suspend mode, the hardware NAT 202 is still able to translate an IP address of data packets 354 and 356 in the Wi-Fi 214 to that of the data packets 354 and 356 in the network 219, and sends the data packets 354 and 356 to the network 219 through the modem 218, because the routing rules relative to the data packets 354 and 356 are still present in the hardware NAT 202. After that, the software NAT 204 suffers a wakeup event (in the block 312), so that the software NAT 204 leaves the suspend mode (in the block 314). The software NAT 204 executes the driver 210 to update the connection table based on newly received data packets from the hardware NAT 202 relative to other routing rules through a command 322.

Since the routing rule removing function of the hardware NAT 202 is disabled, the number of routing rules stored in the hardware NAT 202 may not decreased, thereby decreasing the possibility for the hardware NAT 202 to pass the data packets to the software NAT 204, and the possibility for the software NAT 204 to leave the suspend mode is also decreased. Similarly, the keep-alive function of the hardware NAT 202 is disabled, the hardware NAT 202 may not send the keep-alive packet periodically to the software NAT 204, thereby also decreasing the probability for the software NAT 204 to leave the suspend mode. In addition, since the routing rule removing function of the software NAT 204 is disabled, the number of routing rules stored in the software NAT 204 may not decreased, thereby decreasing the probability of facing new routing rule that has not stored in the software NAT 204. That is, the software NAT 204 is unnecessary to prepare (for example, search from communication commands between user ends) the routing rule for the received data packet relative to the same routing rule again. The method of routing data packets and the electronic device of the present invention can achieve the technical effect of saving power.

The method and the electronic device of the present invention may let the application microcontroller remain in the suspend mode when the data packets is transmitted by the hardware network address translator. That is, all data packets are stored in the second connection table in the hardware network address translator. The connection timeouts in the both application microcontroller and hardware network address translator are both disabled. The application microcontroller enters the suspend mode for saving power.

In the several embodiments provided by the present invention, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of a software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A method of routing data packets, for a router, the router comprising a software network address translator (NAT) and a hardware NAT, comprising:
   routing, by the software NAT, a first data packet based on a routing rule stored in the software NAT, wherein the software NAT has a routing rule removing function to remove the routing rule stored in the software NAT;
   sending, by the software NAT, the routing rule to the hardware NAT;
   storing the routing rule, by the hardware NAT, in the hardware NAT; and
   routing, by the hardware NAT instead of the software NAT, a second data packet based on the routing rule stored in the hardware NAT;
   wherein the routing rule removing function of the software NAT for the routing rule stored in the software NAT is disabled;
   wherein the hardware NAT has the routing rule removing function to remove the routing rule stored in the hardware NAT; wherein the routing rule removing function of the hardware NAT for the routing rule stored in the hardware NAT is disabled.

2. The method as claimed in claim 1, wherein the hardware NAT has a keep-alive function to send a keep-alive packet periodically to the software NAT, wherein the keep-alive function of the hardware NAT for the routing rule stored in the hardware NAT is disabled.

3. The method as claimed in claim 1, wherein the step of sending, by the software NAT, the routing rule to the hardware NAT comprises:
   sending, by the software NAT, the routing rule to the hardware NAT based on a threshold number of the data packets relative to the routing rule received by the software NAT from the hardware NAT within a predetermined time;
   wherein the threshold number is an integer between one and five.

4. The method as claimed in claim 1, wherein a timeout used for determining whether to remove the routing rule stored in the software NAT is disabled.

5. The method as claimed in claim 1, wherein a timeout used for determining whether to remove the routing rule stored in the software NAT is set to be its maximum value.

6. An electronic device, comprising:
- a software network address translator (NAT), configured to route a first data packet based on a routing rule stored in the software NAT, and send out the routing rule; wherein the software NAT has a routing rule removing function to remove the routing rule stored in the software NAT;
- a hardware NAT, configured to receive the routing rule from the software NAT, store the routing rule in the hardware NAT, and route a second data packet based on the routing rule stored in the hardware NAT;
- wherein the routing rule removing function of the software NAT for the routing rule stored in the software NAT is disabled;
- wherein the hardware NAT has the routing rule removing function to remove the routing rule stored in the hardware NAT; wherein the routing rule removing function of the hardware NAT for the routing rule stored in the hardware NAT is disabled.

7. The electronic device as claimed in claim 6, wherein the hardware NAT has a keep-alive function to send a keep-alive packet periodically to the software NAT, wherein the keep-alive function of the hardware NAT for the routing rule stored in the hardware NAT is disabled.

8. The electronic device as claimed in claim 6, wherein the software NAT sends the routing rule to the hardware NAT based on a threshold number of the data packets relative to the routing rule received by the software NAT from the hardware NAT within a predetermined time; wherein the threshold number is an integer between one and five.

9. The electronic device as claimed in claim 6, wherein a timeout used for the software NAT to determine whether to remove the routing rule stored in the software NAT is disabled.

10. The electronic device as claimed in claim 6, wherein a timeout used for the software NAT to determine whether to remove the routing rule stored in the software NAT is set to be its maximum value.

* * * * *